United States Patent
Arnold

(10) Patent No.: US 6,360,911 B1
(45) Date of Patent: Mar. 26, 2002

(54) MOLDED DRAIN PAN

(75) Inventor: Daniel James Arnold, Wichita, KS (US)

(73) Assignee: York International Corporation, York, PA (US)

( * ) Notice: Subject to any disclaimer, the term of this patent is extended or adjusted under 35 U.S.C. 154(b) by 0 days.

(21) Appl. No.: 09/861,561

(22) Filed: May 22, 2001

Related U.S. Application Data

(60) Provisional application No. 60/273,550, filed on Mar. 7, 2001.

(51) Int. Cl.$^7$ ................................................ B01D 47/00
(52) U.S. Cl. ........................................ 220/571; 62/291
(58) Field of Search ............................ 220/571; 62/291, 62/285

(56) References Cited

U.S. PATENT DOCUMENTS

| | | | |
|---|---|---|---|
| 559,358 A | * | 5/1896 | Burt .............................. 220/571 |
| 894,973 A | * | 8/1908 | Morgan ....................... 220/571 |
| 973,474 A | * | 10/1910 | Cameron ..................... 220/571 |
| 1,017,455 A | * | 2/1912 | Otto ............................. 220/571 |
| 2,936,926 A | * | 5/1960 | Miller ......................... 220/571 |
| 3,596,475 A | | 8/1971 | Berger |
| 4,000,779 A | | 1/1977 | Irwin |
| 4,835,984 A | | 6/1989 | Vyavaharkar et al. |
| 4,907,420 A | | 3/1990 | Mahanay et al. |
| 4,986,087 A | | 1/1991 | Sullivan |
| 5,071,027 A | | 12/1991 | Sullivan |
| 5,152,154 A | | 10/1992 | Sullivan |
| 5,195,332 A | | 3/1993 | Sullivan |
| 5,199,276 A | | 4/1993 | Sullivan |
| 5,392,944 A | * | 2/1995 | Jennings ..................... 220/571 |
| 5,429,236 A | * | 7/1995 | Evans ......................... 220/571 |
| 5,511,386 A | | 4/1996 | Russ et al. |
| 5,577,539 A | * | 11/1996 | Shaw et al. ................. 220/571 |
| 5,613,554 A | | 3/1997 | Bull et al. |
| 5,664,430 A | | 9/1997 | Karman |
| 5,664,431 A | | 9/1997 | Martin, Sr. |
| 5,669,230 A | | 9/1997 | Bruce et al. |
| 5,697,227 A | | 12/1997 | Bruce et al. |
| 5,715,697 A | | 2/1998 | Rust, Jr., et al. |
| 5,787,721 A | | 8/1998 | Fromm et al. |
| 5,904,053 A | | 5/1999 | Polk et al. |
| 5,964,370 A | | 10/1999 | Rust, Jr., et al. |
| 5,966,959 A | | 10/1999 | Stewart |
| 5,979,171 A | | 11/1999 | Mitchell et al. |
| 5,987,909 A | | 11/1999 | Martin, Sr. |
| 6,112,536 A | | 9/2000 | Hansen |

* cited by examiner

Primary Examiner—Joseph M. Moy
(74) Attorney, Agent, or Firm—Carmen Santa Maria; McNees Wallace & Nurick LLC

(57) ABSTRACT

A molded drain pan for use with a conditioning system. The drain pan has an inner and outer wall and a bottom creating a donut shaped annular pan to collect condensate. The pan contains a thin support rib, which is inclined to direct condensate towards a drain. The thin rib reduces heat transfer between the pan and a support structure.

9 Claims, 4 Drawing Sheets

MOLDED DRAIN PAN

This application claims benefit of provisional Application No. 60/273,550 Mar. 7, 2001

BACKGROUND OF THE INVENTION

The present invention relates generally to a molded drain pan for use with an air conditioner evaporator coil, heat pump evaporator, or similar application. Though the following disclosure describes an air conditioning system, it should be understood that the present invention could be used with other heating or cooling systems requiring a drain pan.

In most buildings equipped with central air conditioning, the air conditioning system comprises a condensing unit, an evaporator coil, an air handler to circulate air throughout the home, and refrigerant lines connecting the condensing unit and the evaporator coil. A blower pulls the air into the system where it passes over an evaporator coil and then is circulated into the home.

These systems are used not only to reduce the temperature of the air in the home, but also to remove moisture from the air inside the home. The system removes moisture by reducing the temperature of the evaporator coil to below the dew point of the air passing over it. As the air passes over the evaporator coil, the water vapor condenses on the surface of the evaporator coil and is thereby removed from the air. A pan is typically placed beneath the evaporator coil to collect the condensed water. The pan contains at least one drain to which hoses or pipes are connected to dispose of the condensed water. To avoid the growth of microorganisms in the drain pan, it is desirable that the condensate drain from the pan as quickly as possible.

One drawback of these systems is that the structure supporting the evaporator coil typically becomes very cold, due to the conduction of heat from the supporting structure to the adjacent evaporator coil. If the temperature of the supporting structure drops below that of the dew point of the passing air, water will condense on the support structure as well. This water will not be collected by the drain pan and can cause damage to the system.

SUMMARY OF THE INVENTION

The present invention is directed to a drain pan for a conditioning system, comprising an inner wall, an outer wall, and bottom formed to create a generally annular pan to collect condensate. The pan includes a central opening to accept air flow. The pan further comprises a drain in communication with the annular pan. In addition, the annular pan includes a relatively thin rib on the bottom to support the annular pan and to incline the pan towards the drain.

In one embodiment of the pan the rib has a width of no greater than 0.25 inches. In a further embodiment the rib has a width of no greater than 0.125 inches. The bottom of the rib can preferably have a generally rounded shape.

Preferably, the rib is continuous around the perimeter of the bottom of the pan. The rib is shaped to form a seal with a surface on which the pan is to be placed. The first and second sides of the rib are parallel to each other and of different heights and the third and fourth sides are parallel to each other and inclined. In another embodiment, the rib is segmented around the perimeter of the bottom of the pan.

In a further embodiment, the inner wall of the pan is sloped to assist in the collection of condensate.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate one embodiment of the invention and together with the description, serve to explain the principles of the invention.

DESCRIPTION OF THE EMBODIMENTS

Reference will now be made in detail to the present preferred embodiments of the invention, examples of which are illustrated in the accompanying drawings. Though, the following disclosure describes an air conditioning system, it should be understood that the present invention could be used with other heating or cooling systems requiring a drain pan. Wherever possible, the same reference numbers will be used throughout the drawings to refer to the same or like parts.

Figure 1:
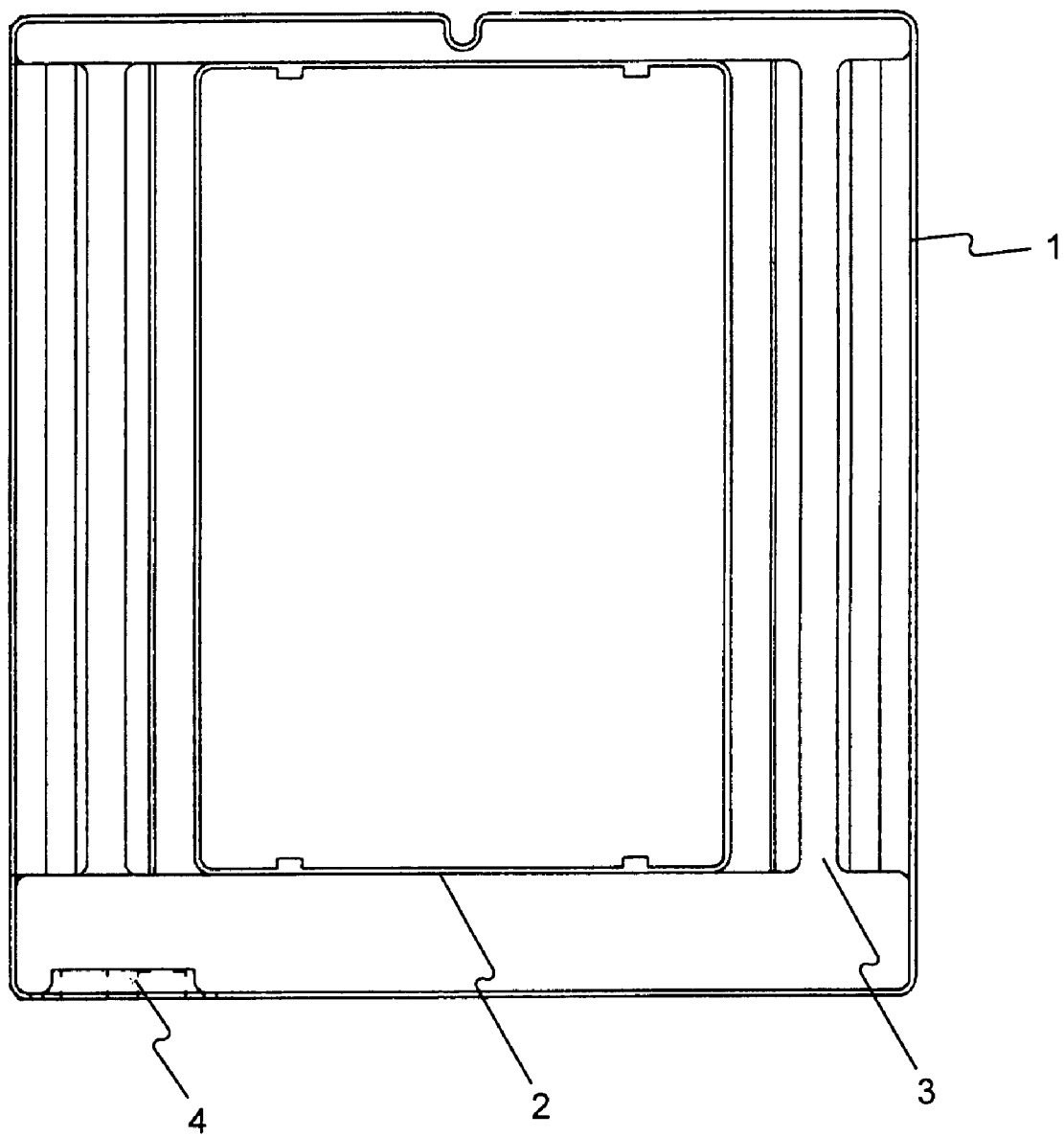
FIG. 1 is a top view of a drain pan of the present invention.

FIGS. 1–4 illustrate the drain pan of the present invention. The drain pan consists of an outer wall 1 and an inner wall 2, defining a generally annular configuration. The drain pan includes a central opening inside of inner wall 2, to accept air flow. The pan shown in FIG. 1 is generally rectangular in shape, but it can be in a variety of shapes, including circular. In all embodiments, the pan includes a generally annular condensate receiving pan that extends about the perimeter of the pan, from its outer wall, to its inner wall.

Figure 2:
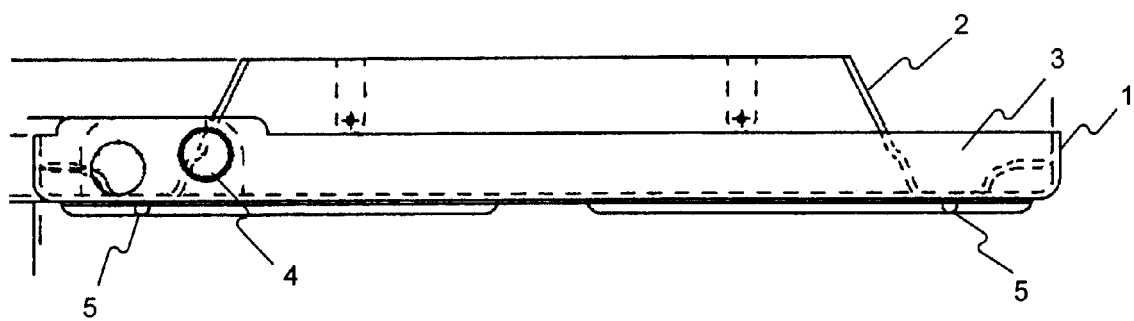
FIG. 2 is a side view of a drain pan of the present invention.
Figure 4:
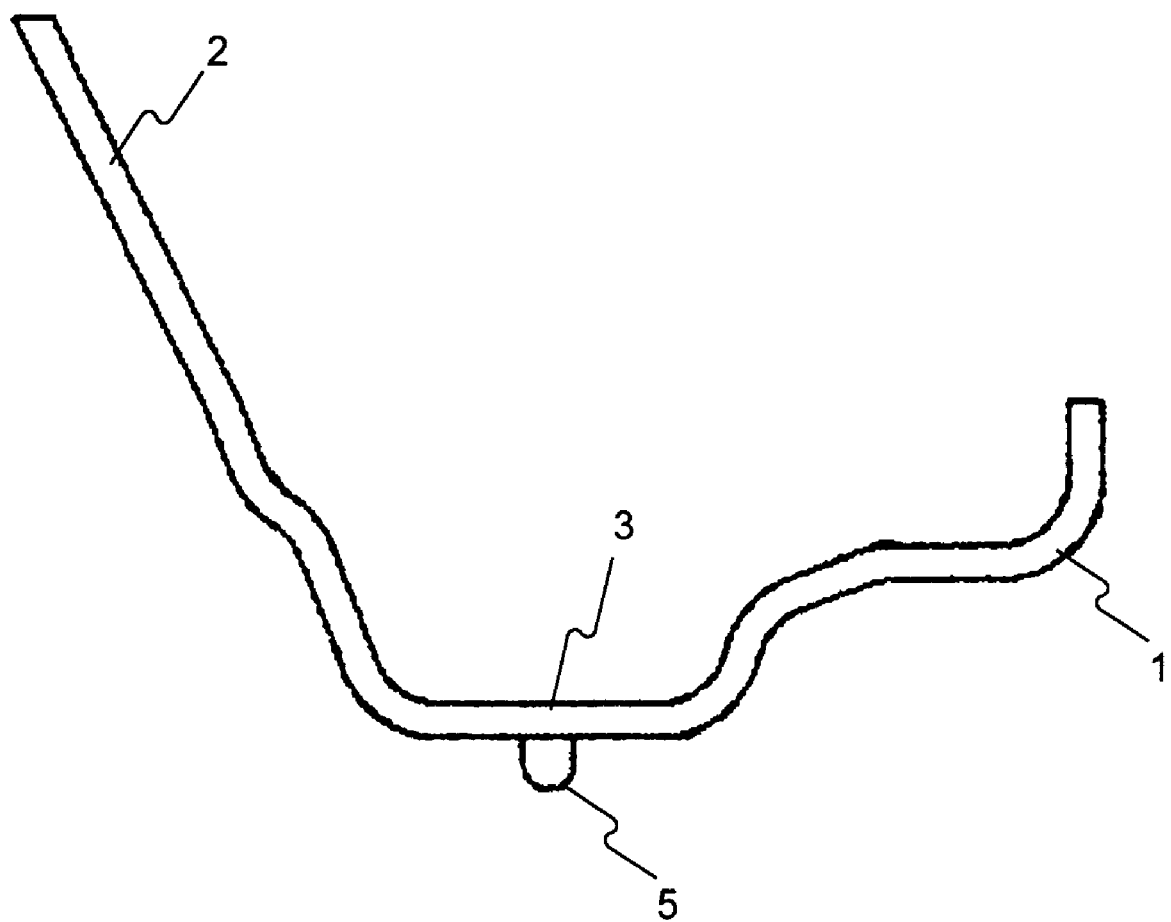
FIG. 4 is a cross-section of a portion of the drain pan of the present invention.

As shown in FIGS. 2 and 4, the inner wall 2 preferably has a greater height than the outer wall 1. The walls and the bottom of pan create a generally annular pan 3 for catching condensation. The inner wall 2 may be sloped to assist in the collection of condensation. A drain 4 is contained at one edge of the pan to dispose of the condensate.

By means of example, in a drain pan with a width of 18¼ inches and a length of 19¾ inches, the height of the inner wall is approximately 2.535 inches, and the height of the outer wall is approximately 1.190 inches. The inner wall creates an angle with the annular portion of the pan of approximately 116 degrees. Although a variety of materials can be used, drain pans molded from polycarbonate plastics have been effective.

In an air-conditioning unit, the evaporator coil sits on top of the drain pan. The pan itself sits on top of a support structure. Air passes over the evaporator coil, through the open section of the drain pan, enters a blower, and is returned to the house. Condensate collects on the A-coil and falls into the drain pan. The condensate then flows out of the drain pan through the drain and is removed from the unit.

Figure 3:
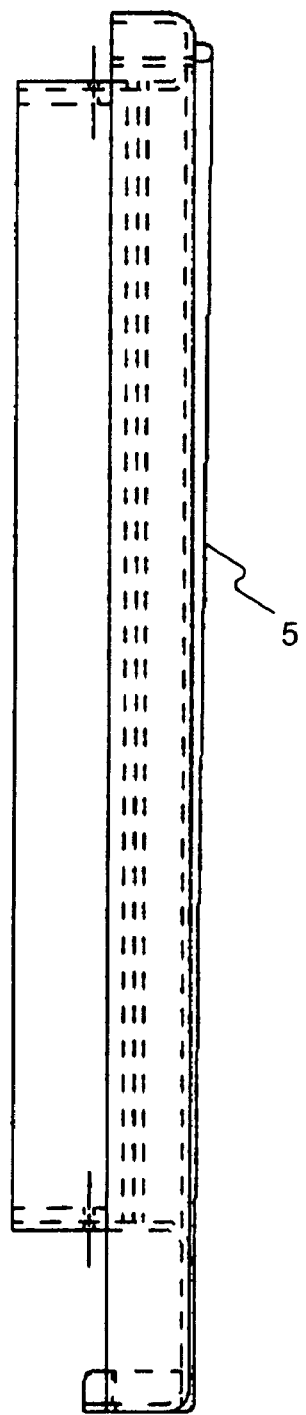
FIG. 3 is a side view of a drain pan of the present invention.

As shown in FIGS. 2–4, the drain pan has a support rib 5 on the underside of the pan. In this embodiment, the support rib 5 has four sides. As shown in FIG. 3, two opposing sides of the support rib are inclined. The other two opposing sides are not inclined, but one side is taller than the other side. The two inclined sides and the two sides of different height combine to give the pan a slope to increase drainage toward the drainage hole or port in the drain pan.

The support rib 5 can be continuous along the entire perimeter of the pan or it can be segmented. Additionally, the rib can be continuous along the entire perimeter of the pan but of varying heights along the perimeter so that only selected portions of the rib would seat against the supporting surface. Reducing the amount of the rib touching the support surface reduces the heat transfer between the pan and the support surface. However, the use of a continuous support rib 5 around the perimeter of the drain pan allows the pan to create a seal with the support surface. This design is preferred since it ensures that most of the airflow will occur inside the inner wall 2.

The support rib 5 is designed to have a relatively thin cross-section along its width and height to minimize the potential conductive heat transfer along the rib and between the rib and the supporting surface. The bottom of the rib similarly is relatively thin in cross section at the interface of the support rib and the structure on which the drain pan is placed. Preferably, the bottom of the rib has a rounded shape so as to create a narrow point of contact.

By means of example, in a drain pan with a width of 18¼ inches and a length of 19¾ inches, the height of the taller side of the support rib 5 is approximately 0.250 inches and the height of the smaller side of the support rib 5 is approximately 0.063 inches. The rib has a width of approximately 0.25 inches, but more preferably it would have a width of approximately 0.125 inches. The rounded bottom of the rib has a radius of approximately 0.125 inches.

The use of a thin rib reduces the potential for heat transfer between the pan and a supporting structure, which is typically metal. As a result, even though the drain pan is relatively cold, the support structure will not transfer a great deal of heat from the structure to the pan and thereby become so cold as to permit condensation to form on the support structure, causing potential damage to the residence or the place where the evaporator is positioned.

According to the preferred embodiment, the relatively thin supporting rib 5 provides the required inclination of the drainage pan toward the drain 4. It also minimizes heat transfer between the pan and its supporting structure upon which it rests, while providing sufficient strength and rigidity to support the pan, the evaporator coil and any condensate dripping into the pan as it drains.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A drain pan for a conditioning system, comprising:

an inner wall, an outer wall, and bottom formed to create a generally annular pan to collect condensate, said pan including a central opening to accept air flow;

a drain in communication with the annular pan; and a relatively thin rib on the bottom to support the annular pan and to incline the pan towards the drain.

2. The drain pan of claim 1, wherein the rib has a width of no greater than 0.25 inches.

3. The drain pan of claim 1, wherein the rib has a width of no greater than 0.125 inches.

4. The drain pan of claim 1, wherein the bottom of the rib has a generally rounded shape.

5. The drain pan of claim 1, wherein the rib is continuous around the perimeter on the bottom of the pan and shaped to form a seal with a surface on which it is to be placed.

6. The drain pan of claim 5, wherein first and second sides of the rib are parallel to each other and of different heights and third and fourth sides of the rib are parallel to each other and inclined.

7. The drain pan of claim 1 wherein the rib is segmented around the perimeter on the bottom of the pan.

8. The drain pan of claim 1 wherein the inner wall is sloped to assist in the collection of condensate.

9. A drain pan for a conditioning system, comprising:

an inner wall, an outer wall, and bottom formed to create a generally annular pan to collect condensate, said inner wall being sloped to assist in the collection of condensate and said pan including a central opening to accept air flow;

a drain in communication with the annular pan; and a relatively thin rib continuous around the perimeter on the bottom of the pan and shaped to form a seal with a surface on which it is to be placed to support the annular pan and to incline the pan towards the drain, the bottom of said rib having a generally rounded shape and said rib having a width no greater than 0.125 inches.

* * * * *